Nov. 13, 1962     G. B. PRARIA     3,064,187
TRANSCONDUCTANCE MEASUREMENT
Filed Nov. 4, 1959     2 Sheets-Sheet 2

INVENTOR.
Guy B. Praria
BY
Wilfred G. Caldwell
ATTORNEY

United States Patent Office 3,064,187
Patented Nov. 13, 1962

3,064,187
TRANSCONDUCTANCE MEASUREMENT
Guy B. Praria, Beverly, Mass., assignor to Columbia
Broadcasting Systems, Inc., Danvers, Mass., a corporation of New York
Filed Nov. 4, 1959, Ser. No. 850,863
7 Claims. (Cl. 324—57)

This invention relates to electrical measurements, and more particularly to the measurement of the mutual conductance, or transconductance of electron discharge devices and similar circuit elements.

The mutual conductance, or more commonly, the transconductance of an electron tube is defined as the ratio of the change in plate current to the change in grid voltage which produced it, with plate voltage held constant:

$$g_m = \frac{\Delta i_b}{\Delta e_c}\bigg|_{e_b = \text{constant}} \text{ mhos}$$

Since this ratio is a measure of the ability of the tube to provide signal power output, it is an extremely important parameter to the circuit designer. A range of values is established for each type within which the transconductance of each tube manufactured must lie. This range is published in tube manuals or other data sources to provide the circuit designer with the requisite information.

At the conclusion of the manufacturing process, each tube must be individually tested to determine its transconductance. One of the common measuring techniques consists of applying a signal of known amplitude to the grid of the tube under test and measuring the current flowing through a sensing resistor in the plate circuit. To keep D.C. voltage drops to a minimum, the sensing resistor has to be kept small. Thus amplification of the signal appearing across the sensing resistor is required to enable an accurate measurement. The gain of the amplifier used has to be kept constant at a known value to provide uniform, accurate results and, since amplifiers are subject to drifts in gain, frequent recalibration is required. This, coupled with the difficulty inherent in trying to keep the small grid input voltage constant at the predetermined level makes this measurement procedure costly, time consuming and unreliable.

Accordingly, it is the principal object of this invention to provide an improved method and apparatus for measuring the transconductance of an electron discharge device.

It is a further object of this invention to provide an improved transconductance measuring circuit arrangement particularly suitable for factory testing purposes.

Still another object of this invention is to provide a transconductance measuring circuit wherein constant recalibration is avoided.

An additional object of this invention is to provide a measuring circuit making use of an improved indicating arrangement whereby operator error is reduced to a minimum.

In accordance with an illustrative embodiment according to the present invention, the output of an oscillator is applied through a first voltage divider to the input electrode of the device under test and through a phase inverter and a reference level circuit to one terminnal of a fixed resistive impedance element. This reference level circuit comprises a pair of parallel connected potentiometers, the output of one being used as the reference level for the low end of the acceptable range and the output of the other being used as the reference level for the high end of the range. A 60 cycle chopper alternately switches the reference signal between the two levels. The output of the device under test is connected to the other terminal of the fixed impedance and algebraically combined with the reference currents. If the reference current is larger than the output current, the resultant signal is of one phase; if the reference current is smaller than the output current, it is of the opposite phase. The resultant signal is amplified and applied to a phase detector and indicator, the latter consisting of a double neon bulb, both sides of which will light if the tube under test is within acceptable limits. If the device under test is not within the acceptable limits, one or the other of the neon elements will light, thereby indicating whether the value is above or below the acceptable range. This type of indication is of importance to the manufacturer in correcting production line difficulties. Since both reference signal and grid input signal are from the same source and are applied simultaneously, any change of oscillator amplitude or frequency will affect both equally and will not disturb circuit accuracy. Moreover, since it is the phase rather than the amplitude of the resultant signal which indicates the measurement, the gain of the amplifier is not critical; it being required merely that it be sufficiennt to drive the indicator.

The foregoing brief description and other objects, features and advantages of the invention will become apparent from the following more detailed description thereof, when taken in conjunction with the accompanying drawings, wherein.

Figure 1:
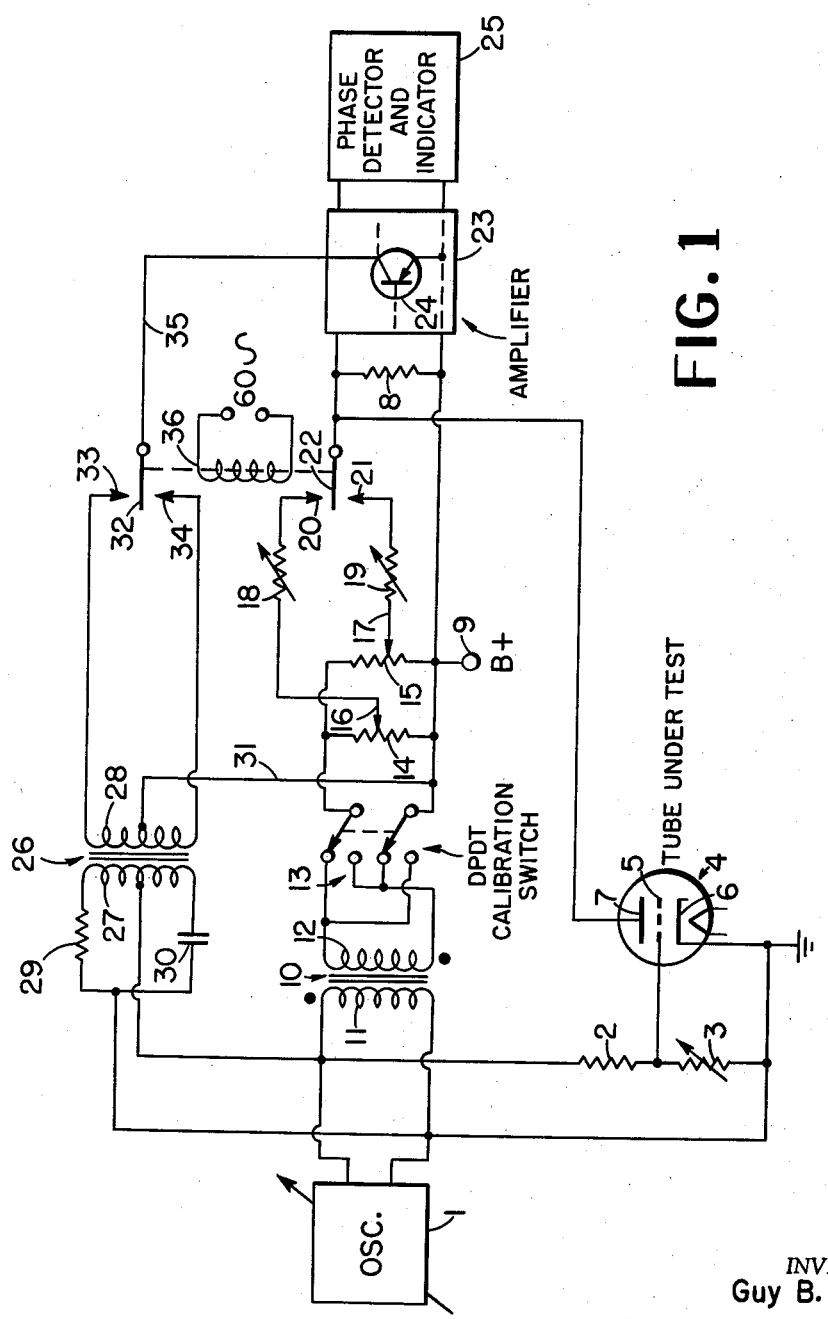
FIG. 1 is a schematic diagram of an improved measuring circuit in accordance with the invention.

Referring now to FIG. 1 of the drawings, sinusoidal oscillator 1, which may be of any suitable type, is coupled across a voltage divider consisting of resistors 2 and 3, the latter preferably being made variable to permit a range of adjustment. The tube under test 4 has its grid electrode 5 connected to the junction of resistors 2 and 3 and its cathode 6 tied to the other terminal of resistor 3 which preferably is grounded. The plate circuit of the tube 4 may be traced from its plate 7 to the one terminal of sensing resistor 8, through the sensing resistor, and to the plate potential source 9.

Suitable grid bias and heater sources (not shown) are provided to permit the tube to be operated at the proper point on its characteristic. Although a triode has been shown for purposes of example, it will be understood that the transconductance of any tube or circuit device having this parameter may be measured by this apparatus, it being only necessary to provide the proper D.C. operating potentials therefor.

The output of oscillator 1, which is preferably variable in frequency to accommodate a wider range of tube types, is also coupled across the primary winding 11 of transformer 10. Secondary winding 12 is so polarized as to effect a phase inversion of the signal applied to the primary, as shown by the dot notation. The output of winding 12 is connected through double-pole, double-throw reversing switch 13 and across a pair of parallel connected potentiometers 14, 15. Sliding contact 16 of potentiometer 14 is connected through variable resistor 18 to one contact 20 of a chopper having an armature 22. Similarly, sliding contact 17 of potentiometer 15 is connected through variable resistor 19 to the other contact 21 of the chopper. The armature 22 of the chopper is connected in common with the plate of tube 4 to the upper terminal of sensing resistor 8. The fixed, or A.C. reference terminals of potentiometers 14 and 15 are connected to the other terminal of resistor 8.

The signal appearing across the sensing resistor 8 provides the input voltage for amplifier 23 which may be of any well known type. In the circuit actually built, the amplifier comprised five RC coupled transistor stages. The particular details of the amplifier are omitted to simplify the drawing, however, a transistor stage 24 has been shown in part to facilitate understanding of one part of the operation. The output of amplifier 23 is fed to the input of the phase detector and indicator 25.

A third portion of the output of oscillator 1 is connected to the primary side of transformer 26, having a primary winding 27 and secondary winding 28. The primary winding 27 is arranged in a series loop with resistor 29 and capacitor 30, these latter two elements comprising a phasing network. The output of oscillator 1 is coupled between the common terminal of resistor 29 and capacitor 30 and a center tap on primary winding 27. Conductor 31 ties the center tap of secondary 28 to the fixed or reference end of potentiometers 14, 15.

The upper and lower terminals of secondary winding 28 are connected to contacts 33 and 34 respectively of a second chopper having an armature 32. The latter is connected via conductor 35 to the collector of transistor 24 in amplifier 23. A chopper coil 36, driven from a standard 60 cycle, A.C. power source, drives both chopper armatures 22 and 32 in unison at a 60 cycle rate.

Figure 2:
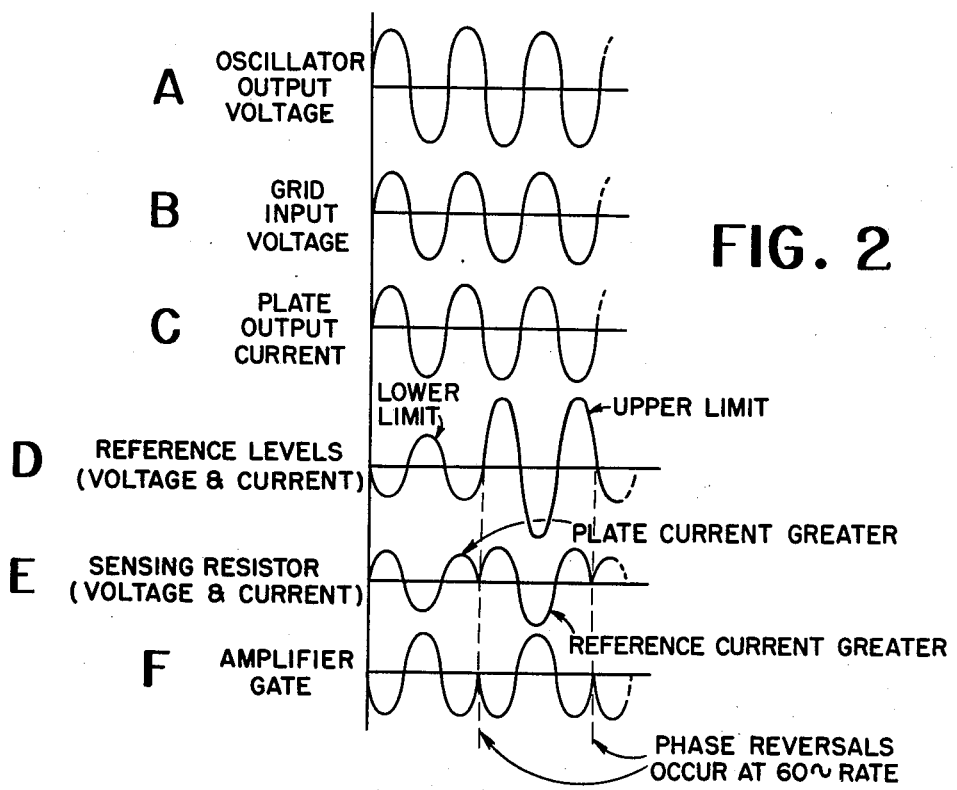
FIG. 2 shows a series of waveforms illustrating the operation of the circuit of FIG. 1.

Operation of the apparatus will be explained with the aid of the curves of FIG. 2. Since it is the phase of the various currents and voltages which are critical, rather than magnitude, the amplitudes of the curves shown are not drawn to scale. It will also be apparent from the discussion hereinbelow that only the A.C. potentials and currents in the circuit enter into the measurement. Accordingly, D.C. levels are omitted from FIG. 2.

At the beginning of the measurement procedure, contacts 16 and 17 of their respective potentiometers 14 and 15 are set to establish the upper and lower limits of the acceptable range, calibration switch 13 is in the position shown, and voltage divider 2, 3, is adjusted to provide the proper alternating current input signal to the tube under test. The output current of the tube under test flows through sensing resistor 8 and will remain substantially constant throughout the measurement. As can be seen from curves A, B and C of FIG. 2, the oscillator output voltage, the grid input voltage, and the plate output current are all of like phase.

The phase of the oscillator output is reversed by transformer 10 and the secondary voltage applied across potentiometers 14 and 15. Armature 22 and contacts 20, 21 alternately connect the outputs of the two potentiometers across the sensing resistor 8. The current flow through resistor 8 resulting from the potentiometer voltages will be opposite in phase to the tube output current. Moreover, this current will alternate between the low and high reference amplitudes at a 60 cycle rate. Curve D of FIG. 2 illustrates this relationship.

The resultant current flowing in sensing resistor 8 will be the algebriac sum of the reference and the tube output currents. Assuming the transconductance of the tube under test is within the acceptable range, its output current will be greater than the lower limit reference level and less than the upper limit reference level. Therefore, during the period that the lower reference level is being applied to the sensing resistor, the resulting current is of the same phase as the tube output current; while the upper reference level is being applied, the net current is of the same phase as the reference current. This is illustrated in curve E of FIG. 2. The phase of the current in resistor 8 will therefore reverse at a 60 cycle rate if the tube under test falls within the acceptable range.

Should the tube under test have a transconductance below the acceptable range, both reference levels will override the tube output and the net current in the sensing resistor will remain continuously in the same phase as the reference level. In the case where the tube transconductance is above the range of acceptance, the situation is reversed and the net current flow in resistor 8 will be continuously in the same phase as the tube output current. Thus the phase, rather than the amplitude, of the current in the sensing resistor 8 provides the indication of whether the transconductance of the tube under test is within, below, or above the acceptable range. It is also noted at this point, that any oscillator variation will not affect the accuracy of the measurement since any change in the grid input signal will be accompanied by a proportional change in the reference signals.

Figure 3:
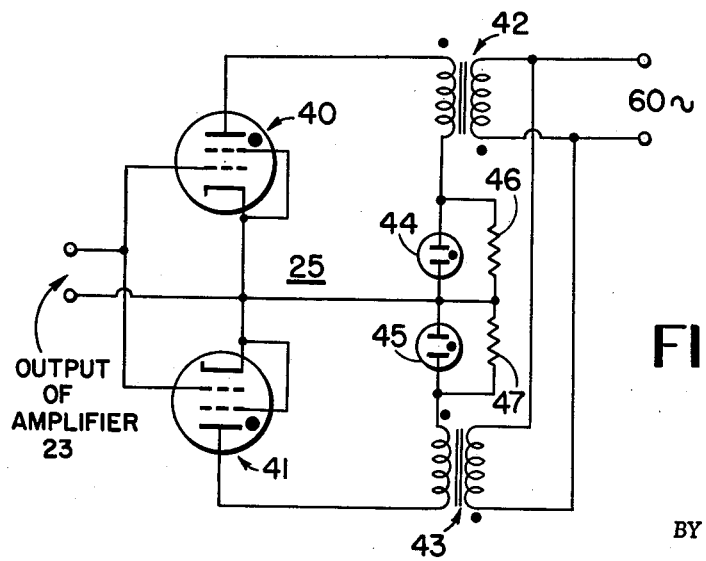
FIG. 3 is a schematic diagram of a phase detector and indicator circuit used in the practice of the invention.

The phase of the current in the sensing resistor, and thus the result of the measurement, is amplified at 23 and detected and indicated at 25. The latter circuit is shown in FIG. 3 and comprises a pair of similar gas filled thyratrons 40, 41 (e.g. type 2D21) having their control grids excited in parallel by the output of amplifier 23, and a pair of transformers 42, 43, providing alternating plate potentials for the tubes. The primaries of transformers 42, 43 are driven in parallel by a 60 cycle source, which may be the same as that driving the chopper coil 36 (FIG. 1). The respective secondaries have one terminal connected to the plate of the associated thyratron and are driven push-pull. The other terminals are coupled through parallel combinations of neon glow tubes and resistors, 44, 46, and 45, 47 to the common cathode terminal. Since plate potentials are applied push-pull, the thyratrons will be conditioned for conduction during alternate half cycles of the 60 cycle period. The neon bulbs 44, 45 will glow upon conduction of their respective thyratrons. Although illustrated as two separate bulbs, the two neons may be incorporated into a single envelope having two sets of electrodes.

Referring back not to FIG. 1, a portion of the output of oscillator 1 is applied through transformer 26 and chopper 32, 33, 34 to provide operating potentials (in the example shown, collector bias) to one stage 24 of the amplifier 23. These gating potentials will be of the same frequency as the resultant signal appearing across resistor 8, and are reversed in phase at a 60 cycle rate by the chopper in synchronism with the switching of the reference levels. Elements 29, 30 are provided to establish the phase of the alternating gating potential applied to the amplifier such that the signal applied to the amplifier 23 from resistor 8 must be in phase with the tube output current when the lower limit reference is being applied to resistor 8, in order to get through. When the upper limit reference is being applied, the gating potentials are reversed in phase such that the amplifier will permit signals to get through only if they are in phase with the reference level signals. The amplifier is thus gated to permit a continuous output when the tube under test falls in the acceptable range. Curve F of FIG. 2 illustrates this potential for PNP transistor 24. If the value is above the prescribed upper limit, the amplifier will conduct only during every other half-cycle of the 60 cycle chopper frequency, and similarly, if the value is below the lower limit, an amplifier output will appear only during the alternate half-cycles of the chopper frequency. While the amplifier has been shown as of the transistor type having the gating potentials applied as an alternating bias to the collector of one stage, it is to be understood that any type of amplifier may be used and the gating may be applied in any well known manner.

The amplifier output is applied to the grids of tubes 40 and 41 of the phase detector and indicator 25. The plates of the tubes are driven push-pull by a 60 cycle source which may be the same as or synchronized with the chopper coil source. Accordingly, the tubes 40, 41 are rendered conductive when the amplifier output applied to the grids coincides with a conductive condition of the plate potential. In the case where the tube under test is within the acceptable range, an amplifier output will be present continuously, and both tubes will conduct during the positive going portions of the plate potential. This causes both neons 44, 45 to be lighted on alternate half-cycles of the 60 cycle source. Although the tubes 40 and 41 will be rendered conductive and then extinguished at a 60 cycle rate (because of the alternating plate potentials) the resulting flicker of the neons will be undetectable to the human eye and they will appear to be continuously glowing.

Should the tube under test have a value above the upper reference level, an amplifier output will be available only during alternate cycles of the chopper frequency. Under this condition, only one of the tubes, for example 40, will be rendered conductive and thus the lighting of neon 44 only will indicate that the tube under test is above the range of acceptability. In a similar manner, only neon 45 will be lit when the tube under test is below the prescribed range. The circuit therefore, provides a visual indication of whether the tube being tested is above, below, or within the acceptable range, substantially eliminating operator error. Once the apparatus has been calibrated for the particular tube type, measurement may be made merely by inserting the tube in the circuit and observing the neon indicator. It will be understood of course, that suitable sockets may be provided for facilitating insertion and removal of the devices being tested.

The apparatus may be calibrated by substituting a precision resistor for the device under test and applying the input signal across it. For example, a 1000 ohm resistor in the circuit would be the same as a tube having a transconductance of 1000 micromhos. The reversing switch 13 is thrown to its other position to provide proper phase relationships and upper and lower limit potentiometers 14, 15 are adjusted to their lowest and highest positions respectively. Variable resistors 18 and 19 are then adjusted until both neons 44 and 45 are on the verge of being extinguished. This establishes the 1000 micromho point on each potentiometer.

It can be seen from the foregoing that a simple to use, accurate and reliable method and apparatus has been provided for measuring the transconductance of electron discharge and similar devices. Although shown and discussed in this environment, it will be realized that the technique utilized can be readily applied to other circuit devices where measurement of a similar parameter is desired. The indication provided is of the "Go—No Go" type, reducing operator error to a minimum and making it extremely attractive for production line use. Further more calibration can be made simply, using only resistors, and variations in input conditions do not affect the result.

It will be understood that various modifications may be made by those skilled in the art without departing from the spirit and scope of the invention.

What I claim is:

1. Apparatus for measuring the ratio of output current to input voltage of a circuit device comprising, a source of test signals of predetermined magnitude, means for applying said test signals to the input of said device, a pair of potentiometer networks, means connecting the output of said signals source across said potentiometer networks, a fixed impedance element having two terminals, switching means alternately connecting the outputs of respective ones of said potentiometer networks to one terminal of said impedance whereby two different signal levels are alternately applied thereto, means connecting the output of said circuit device to the other terminal of said impedance element, and means for indicating the phase of the resultant signal appearing across said impedance element.

2. Apparatus for measuring the ratio of output current to input voltage of a circuit device comprising, a source of test signals, means applying said signals to the input of said device, means for generating a pair of reference signals of different magnitudes, said magnitudes defining a range of acceptable ratios, means for algebraically combining the output of said device repetitively with alternate ones of said reference signals, and phase detecting means including a pair of indicating elements, one of which is operative when the measured value is above said range, the other of which is operative when the measured value is below said range, and both of which are operative when the measured value is within said range.

3. In a circuit for measuring the ratio of output current to input voltage of a circuit device including a sensing impedance across which are developed alternating current signals continuously of one phase if the measured ratio is below an acceptable range, continuously of the opposite phase if the measured ratio is above the acceptable range, and alternately of both said phases if the measured ratio falls within said range, gating means coupled to said sensing impedance operative to pass signals of said two phases alternately at a frequency equal to the rate at which said alternating current signals reverse phase when the measured ratio falls within the acceptable range, and a detecting circuit comprising a pair of electron discharge devices having grid and plate electrodes, means for energizing said plate electrodes in push-pull in synchronism with said gating means, means connecting the output of said gating means in parallel to said grids, and an indicating device connected to each of said plate electrodes.

4. The apparatus of claim 3 above where each of said indicating devices comprises a neon bulb.

5. Apparatus for measuring the ratio of output current to input voltage of a signal translating device comprising, a source of test signals of a first frequency, a fixed resistive impedance element, means applying said test signals to the input of said device, means coupling the output of said device to said impedance element to cause current flow therethrough of a first phase, a pair of potentiometer networks, means providing phase inversion coupling said signal source across said potentiometer networks in parallel, means operative at a second frequency for alternately coupling said potentiometer networks to said impedance element to cause current flow therethrough opposite in phase to said first phase, the output currents of said potentiometer networks being of different magnitudes, means for amplifying the resultant signal appearing across said impedance element, and means for continuously indicating the phase of said amplified signal.

6. The apparatus of claim 5 above, further comprising gating means for said amplifier synchronized with said alternately coupling means for rendering said amplifier alternately responsive to signals of opposite phases.

7. The apparatus of claim 6 above wherein said indicating means comprises a pair of electron discharge devices having grid and plate electrodes, means for energizing said plate electrodes in push-pull at said second frequency in synchronism with said gating means, means connecting the output of said amplifier to both said grids, and a neon glow device connected to each of said electrodes.

References Cited in the file of this patent

UNITED STATES PATENTS

| 1,957,074 | Miller | May 1, 1934 |
| 2,555,368 | Philpott | June 5, 1951 |
| 2,589,721 | McNaney | Mar. 18, 1952 |
| 2,595,675 | Jaynes | May 6, 1952 |
| 2,617,858 | Brink | Nov. 11, 1952 |
| 2,708,718 | Weiss | May 17, 1955 |
| 2,896,154 | Nagy | July 21, 1959 |
| 2,941,143 | Liao et al. | June 14, 1960 |
| 2,973,473 | Oakes et al. | Feb. 28, 1961 |

FOREIGN PATENTS

| 328,049 | Great Britain | Apr. 24, 1930 |